United States Patent [19]

Langen et al.

[11] Patent Number: 4,924,771
[45] Date of Patent: May 15, 1990

[54] DEVICE FOR THE INJECTION OF A QUANTITY OF MEAT

[75] Inventors: Christianus P. Langen; Johannes C. Langen, both of Cuijk, Netherlands

[73] Assignee: Langen Research B.V., Netherlands

[21] Appl. No.: 293,324

[22] Filed: Jan. 5, 1989

[30] Foreign Application Priority Data

Jan. 14, 1988 [NL] Netherlands .......................... 8800081

[51] Int. Cl.$^5$ .......................... B02B 3/12; B02B 23/00
[52] U.S. Cl. ................................................ 99/533; 99/535
[58] Field of Search ................ 99/532, 533, 535, 516; 17/25, 51; 69/30; 426/518, 519

[56] References Cited

U.S. PATENT DOCUMENTS

| | | | |
|---|---|---|---|
| 2,645,171 | 7/1953 | Moreland | 99/532 X |
| 2,656,785 | 10/1953 | Gannon et al. | 99/532 |
| 3,683,789 | 8/1972 | Beasley | 99/533 |
| 4,356,762 | 11/1982 | Langen | 99/533 |
| 4,784,055 | 11/1988 | Langen et al. | 99/533 |

Primary Examiner—Timothy F. Simone
Attorney, Agent, or Firm—Fetherstonhaugh & Co.

[57] ABSTRACT

The device consists substantially of a support for the meat, a holder in which hollow needles are mounted. Each of the needles communicates with an individual dosing chamber which is connected to a common supply conduit for a fluid such as a liquid or a pasty substance or the like which is to be injected into the meat. The device has a dosing chamber in the form of a cylinder which has a movable piston therein for obtaining a constant stroke volume. A driving device is arranged for bringing about relative movement between the piston and the cylinder.

6 Claims, 2 Drawing Sheets

DEVICE FOR THE INJECTION OF A QUANTITY OF MEAT

BACKGROUND OF THE INVENTION

The invention relates to a device for the injection of a quantity of meat, which device consists substantially of a support for the meat, a holder which is arranged by the support and which is equipped with hollow needles, each of which communicates with an individual dosing chamber which is connected to a common supply conduit for a liquid, preferably pasty, substance which is to be injected.

A device of the kind is known from the Dutch patent application 8601328. The invention has for its object to improve the device of the type described in the preamble such that the pasty substance which is offered to the needles remains constant in the respect of quantity, while it is also ensured that the supply to the dosing chambers does not become blocked by fibres in the pasty substance.

SUMMARY OF THE INVENTION

The device is distinguished according to the invention in that the dosing chamber is embodied as a cylinder with a movable piston therein for obtaining a constant stroke volume, whereby driving means are arranged for the bringing about of a relative motion between the piston and the cylinder.

Owing to the constant stroke volume, the constant quantity of pasty substance supplied to the meat in each cycle is precisely determined.

In a particularly simple embodiment, the needle takes the form of a piston, while the cylinder is guided movably along the needle. In this way hardly any leakage losses occur, and the dosed quantity of the pasty substance is delivered directly to the needle.

In a further embodiment the end portion of the needle shank is formed with grooves, which form a connection between the common supply channel and the dosing chamber in the cylinder. In this way is ensured that no blockages occur since owing to the relative motion between needle and cylinder, such grooves are kept clean.

To obtain an accurate dosage quantity, it is recommended that the end portion is also provided with a transverse bore, which is similarly alternately closed off and released by the cylinder wall during the relative motion of the cylinder and the needle shank.

It is recommended that the cylinder is connected to a piston which operates in a driving cylinder. By this means the collective driving of the cylinders can take place in simple manner by means of a common driving medium, for example hydraulically or pneumatically. Hence a uniform supply of the dosed quantities of pasty substance is ensured at each needle.

In order to keep the pressure in the driving medium relatively low with respect to the pressure with which the pasty substance is supplied to the needles, it is recommended that the diameter of the drive piston is made larger than that of the needle shank. In this way the device can be made relatively light in weight on account of the absence of heavy drive cylinders, while a high pressure is still provided to the individual needles.

It is further advantageous to mount each needle shank removably in the holder, in order to facilitate their interchangeability in the case of wear, but to allow in addition the dosed volume to be adjusted to the required quantity by the selection of an appropriate length of the needle shank. With this arrangement, the stroke of the cylinder can remain constant.

The invention further proposes forming the needle with more than one outflow opening, each of which is connected to the common axial channel in the needle, so that the spreading of the pasty substance in the quantity of meat is considerably improved.

BRIEF DESCRIPTION OF THE DRAWINGS

The invention will be further elucidated below by reference to a specific embodiment.

In the drawing:

FIG. 3 shows on an enlarged scale a section of a single needle with dosing cylinder and drive cylinder from FIG. 2.

DESCRIPTION OF THE PREFERRED EMBODIMENT

The quantity of meat (not shown) which is to be treated is introduced into a vessel 1, which is rollable on castors 2 for easy transport.

Figure 1:
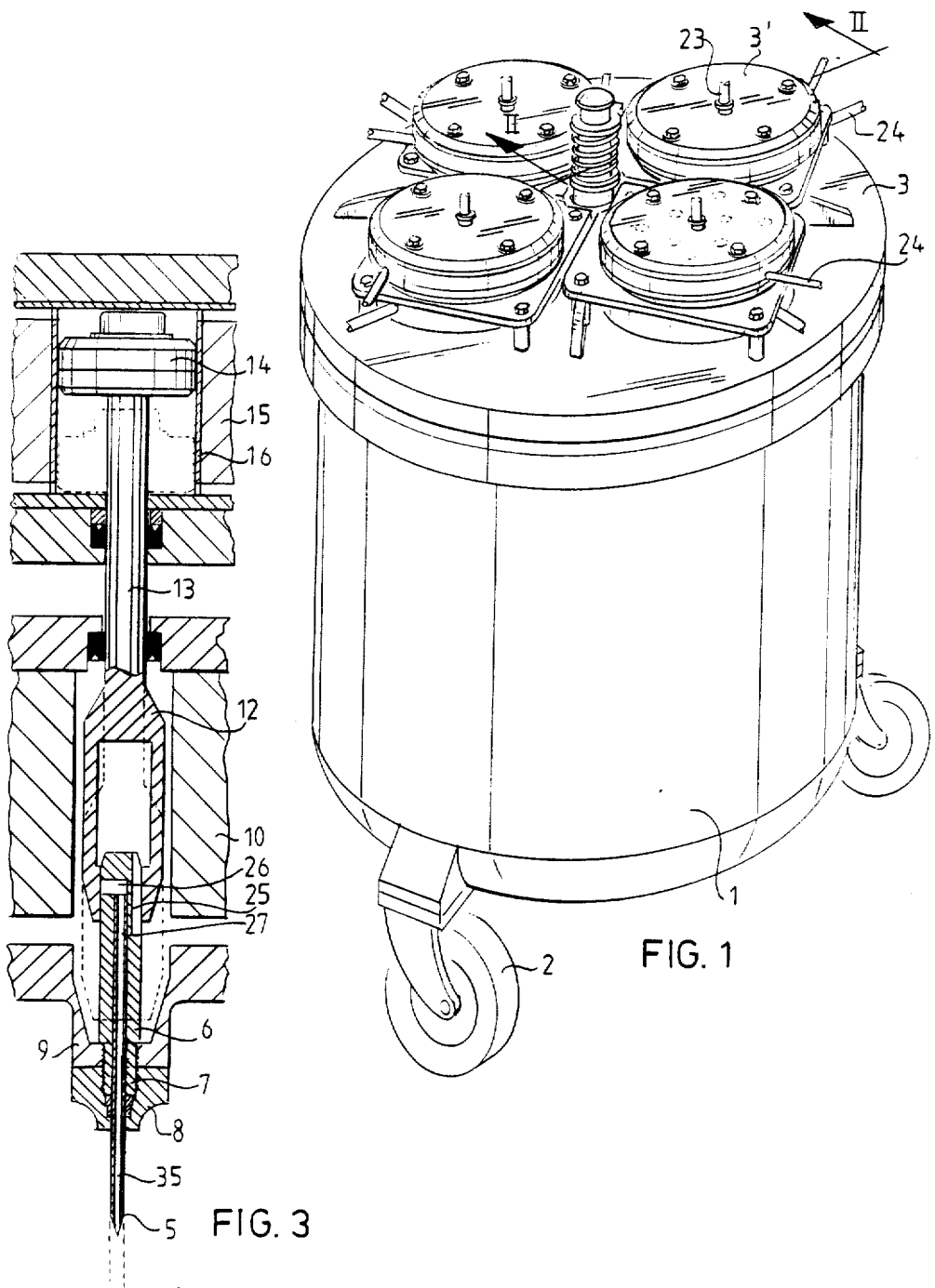
FIG. 1 shows a perspective view of a support embodied in the form of a vessel provided with four holders, each of which is provided with pneumatically operable needle groups according to the invention.
Figure 2:
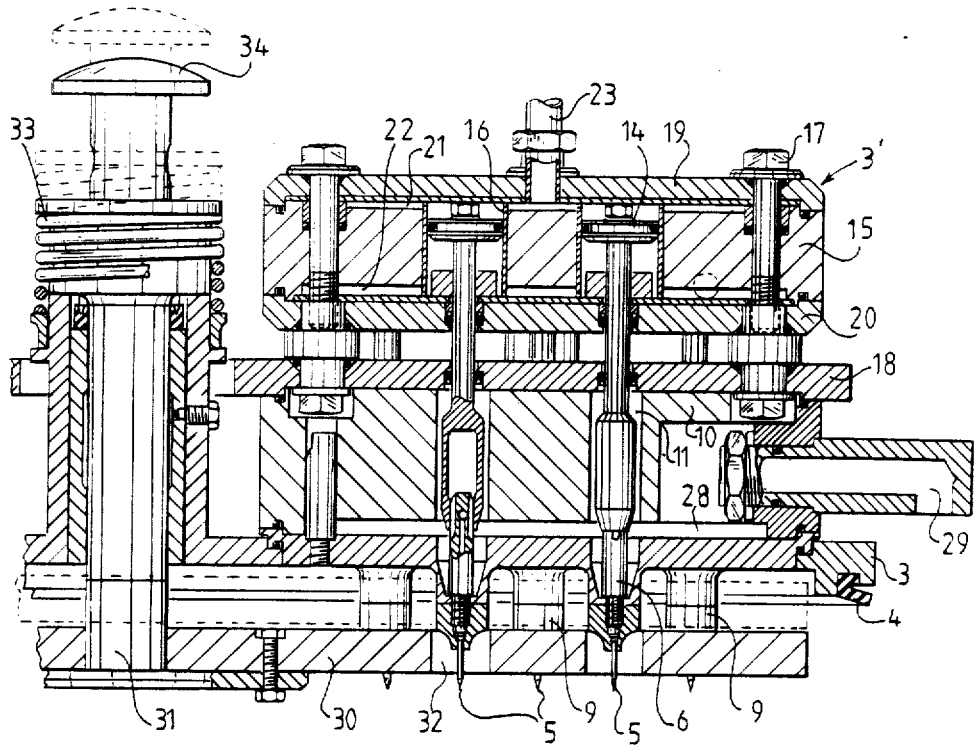
FIG. 2 shows a vertical section along the line II—II in FIG. 1.

The vessel 1 is closed off by a cover 3, which can take any arbitrary form and as according to FIG. 2 is provided with a sealing ring 4 in order to obtain an airtight seal around the top periphery of the vessel 1. The mounting of the cover 3 on the top edge of the vessel 1 can be embodied in any manner and further falls outside the scope of the present invention.

The cover 3 is provided with 4 holders 3' with needles 5, which are thus arranged in four groups. Such a group is shown in detail in FIG. 2, while the individual needle is represented on an enlarged scale in FIG. 3.

Each needle is held in a needle shank 6, which is provided at the end facing towards the point of the needle with a thinned portion made with a screw thread 7. This part is guided through a hole in the cover 3 and screwed firmly into a nut-like body 8, so that the shoulder of the needle shank 6 is pressed tightly against the upper surface of cover 3. As such, each needle 5 is mounted securely in the cover 3.

Each needle is moreover received in a protruding cylindrical part 9, which is arranged on the underside of the cover 3, and of which the outer circumference corresponds to the outer circumference of the nut-like body 8. The function of this will be elucidated below.

Each needle group 3' on the cover 3 is provided with a dosing plate 10 which is mounted securely on the cover and is provided with borings 11, each of which accommodates a cylinder body 12, the bottom end of which is open and fits closely around the shank 6 of the needle 5. The cylinder 12 is connected via a rod 13 to a piston 14, which is movable up and down in a cylinder housing 15 arranged above the cover. The cylinder housing 15 is embodied with a cylinder wall 16, in which the piston 14 can be moved up an down.

The cylinder plate 15 is mounted securely on a closer plate 18 of the dosing plate 10 by means of a bolt connection 17 such that each cylinder 16 is coaxial with a needle shank 6 of a group. This ensures that a movement of the piston 14 in the cylinder 16 is directly transmitted to an axial movement of the cylinder 12 with respect to the needle shank 6.

The drive plate 15, together with the drive cylinder 16, is covered off at the top and bottom by cover plates 19 and 20 respectively, it being noted hereby that the part of the drive plat 15 around the cylinders 16 is narrower than the peripheral zone thereof, so that fissural spaces 21 and 22 remain between the cover plates 19 and 20 respectively and the intermediate plate 15. These fissural spaces communicate via holes in the cylinder wall 16 with the top and bottom respectively of the cylinder 12.

The upper fissural space 21 communicates with a common pneumatic pressure line 23, while the lower fissural space 22 communicates with a common pneumatic pressure line 24.

Returning to the needle shank 6 in FIG. 3, it is noted that this is provided with axially oriented fissural passages 25 at its upper end, so that the top end of each channel 25 communicates with the space in the cylinder 12. The shank 6 is further provided with a transverse bore 26, which communicates with the axial channel 27 in each needle 5.

The dosing plate 10 is made with a recess on the underside so that a fissural space 28 results between this plate and the cover 3, which space itself communicates with a common supply conduit 29 for the preferably pasty substance which is to be injected.

Finally, it is noted that a wiper plate 30 is arranged on the underside of the cover 3, which plate is movable by means of a central spindle 31 in an upward and downward direction with respect to the cover 3, such that the through holes 32 in the plate can slide along the cylindrical protuberances 9 of the cover.

The plate 30 is preloaded via the shaft 31 by means of a helical spring 33, such that the plate 30 is always held against the underside of the cover 3. A pusher end 34 of the spindle 31 can be operated centrally in order to move the plate 30 away from the cover 3.

The device described above works as follows.

Assuming that enough pasty substance has arrived through the common supply conduit 29 into the space 28 and hence into each bore 11 of the dosing plate 10, then, after the exertion of some pressure, the dosing chamber in the cylinder 12 will also become filled up via the axial channels 25 in the needle shank 6. Through actuation of the pressure medium at the top of the piston 14 via the common supply line 23, the piston is moved downwards carrying cylinder 12 with it, so that after a certain distance the axial channels 25 become closed off and the transverse bore 26 which until now was closed is released, so that the pasty substance is offered via this bore to the central channel 27. This pasty substance can be discharged via the outflow opening in the needle 5 into the meat which is situated around the needle 5.

Subsequently, pressure medium can be brought to bear on the other side of the piston 14 through the common supply line 24, whence the cylinder 12 moves back and thereby closes off the transverse bore 26 and releases the channel 25, whence the pasty substance under pressure will fill the chamber in cylinder 12.

The above-described cycle can thereafter be repeated.

Periodically, the pressure knob 34 is pushed to wipe off the quantity of meat which adheres to the needles. The helical spring 33 ensures the undisturbed return of plate 30 relative to plate 3.

Owing to the larger diameter of the piston 14 in comparison with the diameter of the needle shank 6, with a small amount of pressure from the pressure medium via the channel 23 a considerable amount of pressure can nonetheless be exerted on the pasty substance in the cylinder 12, so that the substance can be pressed smoothly through the needles 5. The advantageous working is such that the needle 5 can be provided with more than one outflow aperture, for example in its side wall-see for example aperture 35. A uniform distribution of the pasty substance in the meat is furthered as a result.

The invention is not limited to the above described embodiment. Thus the driving of the cylinder 12 can take place in any random manner other than that shown. Moreover, the dosing in the cylinder 12 can be effected by use of other means than the channels 25 and the transverse bore 26.

The holder 3' with needle group can also be employed with a conveyor belt on which the meat to be treated is laid. It is not necessary for the meat support to be exclusively a vessel.

We claim:

1. In a machine for injecting a fluid into a piece of meat, the machine being of the type having a plurality of injection needle assemblies through which fluid is injected and in which individual dosing chambers are associated with each needle, each dosing chamber having an injection piston member and an injection cylinder member mounted for movement with respect to one another between an extended position in which a dose of fluid may be admitted to the dosing chamber and a retracted position in which the dose of fluid is expelled from the dosing chamber through its associated injection needle, one of the injector members being fixed and the other being moveable with respect to its associated needle, the improvement of:

drive means for driving each moveable member with respect to its associated fixed member comprising; a drive piston mounted on the moveable member and a drive cylinder receiving the drive piston in a close fitting sliding relationship, the drive pistons of the moveable members being free of attachment to one another whereby the drive pistons are independently moveable with respect of one another.

2. A machine as claimed in claim 1 wherein the cross sectional area of the drive piston is substantially greater than the cross sectional area of injection piston member whereby a relatively low pressure applied to the drive piston serves to a relatively high pressure to the moveable member.

3. A machine as claimed in claim 1 wherein each injection cylinder is connected to its associated drive piston for movement therewith and each injection piston is held fast with respect to its associated needle.

4. A machine as claimed in claim 3 wherein each injection piston has an end portion in which longitudinally extending fluid input grooves are formed through which fluid may be admitted to the dosing chamber associated with each piston member when the piston member is in its extended position, the longitudinal extent of said fluid input grooves being such that they do not communicate with the manifold when the injection piston member is in said retracted position.

5. A machine as claimed in claim 2 wherein each injection piston member is releasably mounted with respect to its associated needle whereby a first set of the injection piston members may be replaced by a second set of the injection piston members which may have a different longitudinal extent to that of the first set to charge the capacity of the injection chambers when the injection piston members are in the extended position.

6. A machine as claimed in claim 1 wherein each injection needle has a discharge end and an injection passage which extends longitudinally thereof to the discharge end and a plurality of discharge passages opening from the discharge passage at the discharge end of the injection needle.

* * * * *